United States Patent [19]

Owens

[11] Patent Number: 5,731,679
[45] Date of Patent: Mar. 24, 1998

[54] OFF-LINE PROGRAMMING SYSTEM FOR CONTROL OF INDUSTRIAL ROBOTS

[75] Inventor: John Owens, Newcastle upon Tyne, Great Britain

[73] Assignee: Robot Simulations Ltd., Newcastle upon Tyne, United Kingdom

[21] Appl. No.: 568,597

[22] Filed: Dec. 5, 1995

[30] Foreign Application Priority Data

Dec. 7, 1994 [GB] United Kingdom ............ 9424707

[51] Int. Cl.$^6$ .................................................. B25J 9/04
[52] U.S. Cl. .................. 318/568.19; 318/568.22; 364/474.36
[58] Field of Search ............... 318/567, 568.1, 318/568.11, 568.15, 568.19, 568.22; 364/176, 474.12, 474.25, 474.31, 474.34, 474.35, 474.36; 901/9, 16, 23

[56] References Cited

U.S. PATENT DOCUMENTS

| | | | |
|---|---|---|---|
| 4,616,121 | 10/1986 | Clocksin et al. | 901/42 |
| 4,698,572 | 10/1987 | Stone | 318/574 |
| 4,831,549 | 5/1989 | Red et al. | 364/513 |
| 5,177,563 | 1/1993 | Everett et al. | 901/47 |
| 5,297,238 | 3/1994 | Wang et al. | 395/94 |
| 5,537,119 | 7/1996 | Poore, Jr. | 342/96 |

FOREIGN PATENT DOCUMENTS

| | | |
|---|---|---|
| 0 470 257 A1 | 2/1992 | European Pat. Off. |
| WO 84/03959 | 10/1984 | WIPO |
| WO 84/04980 | 12/1984 | WIPO |

*Primary Examiner*—Jonathan Wysocki
*Attorney, Agent, or Firm*—Zackery Legal Group

[57] ABSTRACT

A system for carrying out offline programming of an industrial robot takes steps to improve upon a known, approximate kinematic model of the robot. By placing three measuring devices within a robot workspace and calculating an approximation of their coordinate frame within that of the workspace, accurate positioning of the measuring devices is not required. This can be achieved by a multivariable search method performed by a computer.

12 Claims, 5 Drawing Sheets

OFF-LINE PROGRAMMING SYSTEM FOR CONTROL OF INDUSTRIAL ROBOTS

BACKGROUND TO THE INVENTION

Field of the Invention

The present invention relates to the control of industrial robots.

Industrial robots are finding increasing application in manufacturing industry to perform repetitive tasks. Before a robot can perform a task, a control program of instructions for carrying out the task must be produced.

There are two main programming methods: on-line and off-line. In on-line programming, an actual robot is manually taken through the task and 'learns' the task by example. However, this is, for many reasons, not always practical. Sometimes a program must be produced using a theoretical model of the robot and its workspace, typically in a computer simulation. This technique is known as off-line programming.

To carry out off-line programming, a computer is typically provided with a kinematic model of the robot and a description of the workspace. The robot can then be manipulated theoretically in the computer, which preferably can represent the robot and its surroundings graphically.

In practice, it has been found that manufacturing tolerances can result in discrepancies between the theoretical kinematic model of a robot and the kinematic properties of an actual robot. Thus, an off-line programming simulation may generate a program which is theoretically correct, but which, when applied to the robot, results in inaccurate movement. It has been found that errors in the kinematic model of a typical robot can result in positioning errors of up to 20 mm.

In principle, it would be possible to reduce manufacturing tolerances so that each robot accorded more closely with its theoretical model. This would, however, increase costs, and would offer no advantage in many applications since the repeat accuracy of robots (often a more important consideration and of prime importance when programming on-line) is already sufficiently good for most purposes.

SUMMARY OF THE INVENTION

The present invention facilitates off-line programming of robots by calibrating a robot to be programmed and modifying off-line programs to account for the characteristics of the robot. While this is not a novel idea in itself, the invention offers improvements over known systems which are typically time consuming, error prone or require highly expensive equipment.

According to a first aspect of the invention, there is provided a system for approximating an actual kinematic model of a robot comprising coordinate generating means operative to generate coordinates (xyz)m of an effect of the robot within an arbitrary coordinate frame m; and data processing means operative to send movement instructions to the robot and receive coordinate data from the generating means; wherein the data processing means:

for a multiplicity of points within the workspace in turn, instructs the robot to move to the coordinate (xyz)w of that point in a known workspace coordinate frame w, and records the arbitrary coordinates (xyz)m of the point to which the robot moves; then using the recorded data, establishes the relationship between the arbitrary coordinate frame m and the workspace coordinate frame w; for each of the multiplicity of points, converts the recorded coordinate to a coordinate (xyz)'w within the workspace coordinate and compares each of the coordinates (xyz)'w to which the robot moved with the corresponding coordinate (xyz)w to which it was directed in order to estimate the modifications required to the theoretical kinematic model to approximate an actual kinematic model for the robot.

Because the coordinate generating means can operate in an arbitrary coordinate frame, it need not be accurately placed within the workpiece, so greatly reducing the time to set up and the accuracy required in setting up the system.

As an example, the coordinate generating means may comprise three measuring means, each operative to indicate the distance between itself and the robot effector, these conveniently comprising an extensible cord wound on a tensioned drum, signals being generated on rotation of the drum. Additionally, in this example, the coordinate generating means comprises signal processing means operative to receive signals from the measuring means, process these signals, and generate coordinate data in the arbitrary coordinate frame. The signal processing means may be constituted in the data processing means and may also be constituted by a software program for execution thereby.

In the example of the last preceding paragraph, the measuring means are preferably disposed in an approximate equilateral triangle. This arrangement has been found to lead reliably to an accurate estimate being calculated. However, since the coordinate frame m can be arbitrarily disposed within the workspace, the positions of the measuring means are not critical.

The relationship between the arbitrary coordinate frame m and the workspace frame can be established by a multivariable search method. The method may include a first step in which the position of the origin of the arbitrary coordinate frame m within the workspace coordinate frame w is estimated, and a second step in which the orientation of the arbitrary coordinate frame is estimated.

In a second of its aspects, the invention provides a method of generating an improved off-line program for a robot comprising:

(a) issuing to the robot a set of commands which, by a first approximate kinematic model would send an effector to each of $P_0 \ldots P_n$ in turn, each $P_0 \ldots P_n$ being at coordinate $xyz^w{}_0 \ldots xyz^w{}_n$ within a workspace coordinate frame;

(b) measuring for each point $P_0 \ldots P_n$ the distance of the effector from these points A, B, C to yield a data triplet $ABC_0 \ldots ABC_n$, each data triplet being recorded; and processing the data as follows:

(c) for each triplet $ABC_0 \ldots ABC_n$, generating a coordinate $xyz^m{}_0 \ldots xyz^m{}_n$ within an arbitrary coordinate frame m;

(d) estimating a point $x_o y_o z_o{}^w$ within the workspace coordinate frame as per the origin of the arbitrary coordinate frame m;

(e) estimating variables $a_m$, $b_m$, and $c_m$ representative of the roll, pitch and yaw of the arbitrary coordinate frame m within the workspace coordinate frame;

(f) estimating link lengths and joint zero positions for all links and joints in the robot; and (g) modifying an off-line program to compensate for the differences between the estimated link lengths and joint zero values and those used to generate the kinematic model.

The arbitrary coordinate frame may be a cartesian frame or one more appropriate (e.g. polar) to the programming commands to be used. Step (c) above may generate $xyz^m$ as follows:

$X_i=(B_x^2+A_i-B_i)/2B_x$ $Y_i=I/2C_y$ $Z_i=\sqrt{A_i^2-X_i^2-Y_i^2}$ where:

$I=C_x^2+C_y^2+A_i-C_i-C_x/B_x/B_x^2+A_i^2-B_c^2)$ $B_x$=the distance between measuring points A and B $C_x=B_x+J^2-K^2$ $C_y=+\sqrt{J^2-C_x^2}$ J=the distance between measuring points A and C; and K=the distance between measuring points C and B.

Step (d) may be performed using a multivariable search, in which, the value:

$$\sum_{i=0}^{n} abs\,(d1_i-d2_i)$$

is minimised where:

$d1_i=\sqrt{X^2+Y^2+Z^2}$ $d2_i=\sqrt{(X_o-X)^2+(Y_o-Y)^2+(Z_o-Z)^2}$

Step (c) can be accomplished by using a multivariable search to minimise:

$$\sum_{i=d}^{n} d_i$$

which:

d=distance between points p1 and p2

$$p1 = T * \begin{pmatrix} X_i \\ Y_i \\ Z_i \end{pmatrix}$$

$p2 = XYZ^m i$ where T is the Transferation matrix.

Step (e) may comprise a multivariable search where the variables are robot link lengths at joint zero angles, where the object of the search is to minimise the sum $$\sum_{i=d}^{n} abs\,(d1_i-d2_i)$$

where:

$d1_i=\sqrt{X^2+Y^2+Z^2}$ $d2_i=\sqrt{(X_o-X)+(Y_o-Y)+(Z_o-Z)}$ where the values of X,Y and Z are modified by forward kinematic calculation using the modified kinematic calculated in steps (a) to (d) above.

Figure 1:
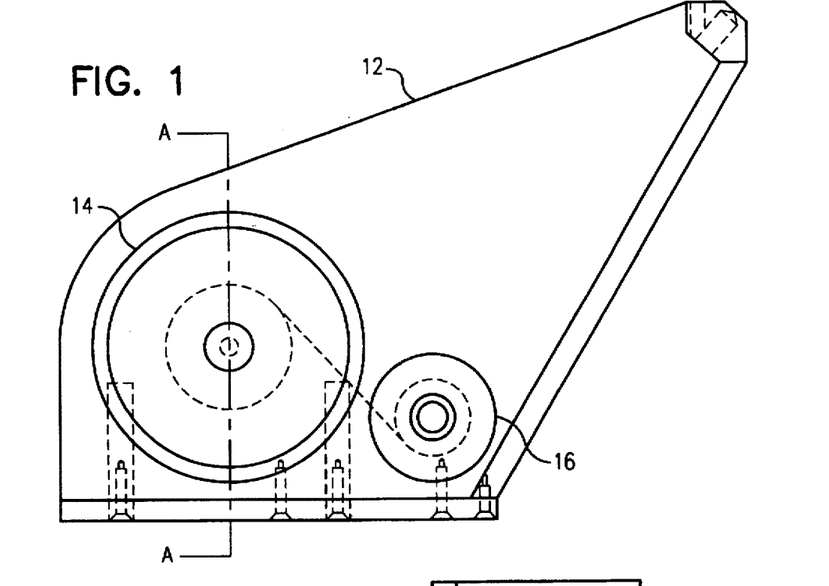
FIG. 1 is a side view of measuring means for use in an embodiment of the invention.
Figure 2:
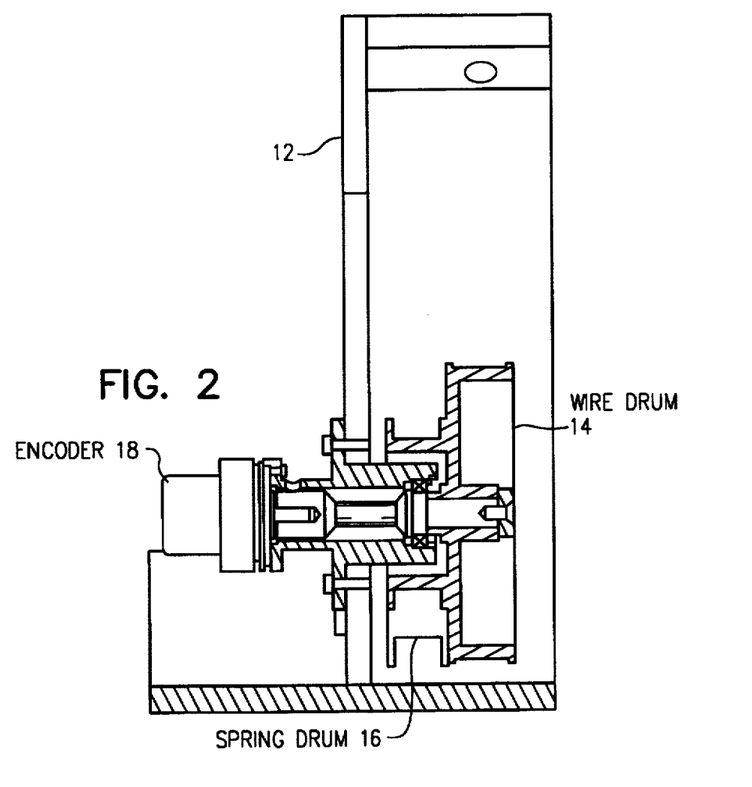
FIG. 2 is a section along A—A in FIG. 1.

With reference to FIGS. 1 and 2, a length encoder 10 constitutes a measuring means for use with the invention is shown.

DETAILED DESCRIPTION OF A PREFERRED EMBODIMENT

The length encoder 10 comprises a support 12 on which is carried a wire drum 14, a spring drum 16 and a rotary encoding transducer 18, and a cord guide 20.

The cord drum 14 is carried coaxially on a coupling shaft 22 to an end portion of which it is fixed. The shaft 22 is carried for rotation about its axis by a rolling-element bearing 24. The bearing 24 is, in turn, supported in a carrier 26 secured to the support 12.

The encoding transducer is fixed to the carrier 26, with its input shaft 28 connected to the coupling shaft 22. Thus, rotation of the cord drum 14 causes corresponding rotation of the input shaft 28 of the encoder 18, the encoder 18 thereby generating output signals by means of which rotation of the cord drum 14 can be determined.

The cord drum 14 comprises first and second coaxial winding portions 30,32, each comprising a cylindrical winding surface bounded at each of its axial extremities with a radially-projecting flange. A length of inelastic cord 34 is wound onto the first winding portion 30, the cord 34 extending therefrom through the cord guide 20.

The spring drum 16 comprises a cylindrical winding surface 36 bounded at its axial extremities by radially projecting flanges. The spring drum 16 is mounted on the support 10 for rotation about an axis parallel to that of the cord drum 14. The spring drum is disposed such that its winding surface 36 is axially co-extensible with, but spaced from, the winding surface of the second winding portion 32 of the cord drum 14.

The spring drum 16 contains internally a torsion spring arranged to provide a restoring torque to the drum 16 as it is rotationally displaced from a neutral position.

A length of cord 40 is wound onto the winding surface of the spring drum 16, and extends therefrom to the second winding portion of the cord drum 14 to which it is fixed. The cord 40 and the spring drum 16 are arranged such that when cord is drawn from it, the drum rotates against the torque applied by the torsion spring. Thus, when cord 34 is drawn through the cord guide 20, the cord drum 14 is caused to rotate as cord unwinds from its first winding portion 30. In turn, cord 40 is drawn from the spring drum and wound onto the second winding portion 32 of the cord drum 14. It will, therefore, be appreciated that the spring drum 16 indirectly applies tension to the cord through the cord drum, such that extension and retraction of the cord causes the cord drum 14 to rotate, such rotation being detectable through the encoder 18, so allowing an indication of the free length of cord 34 drawn from the cord drum 14 to be determined.

Figure 3A:
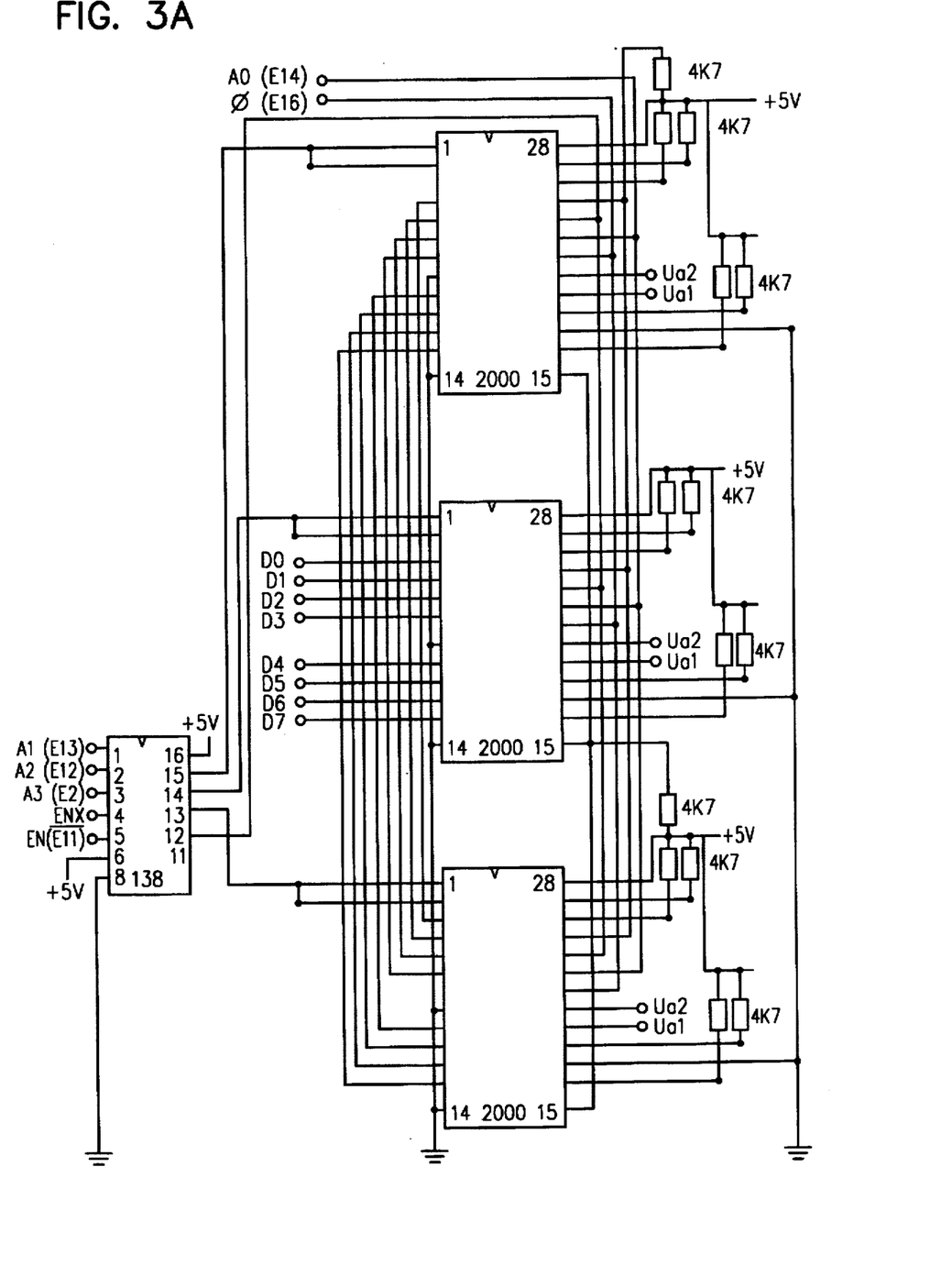
FIGS. 3A and 3B are circuit diagrams of an interface circuit operable to connect the encoder of three of the measuring means of FIGS. 1 and 2 to a personal computer.
Figure 3B:
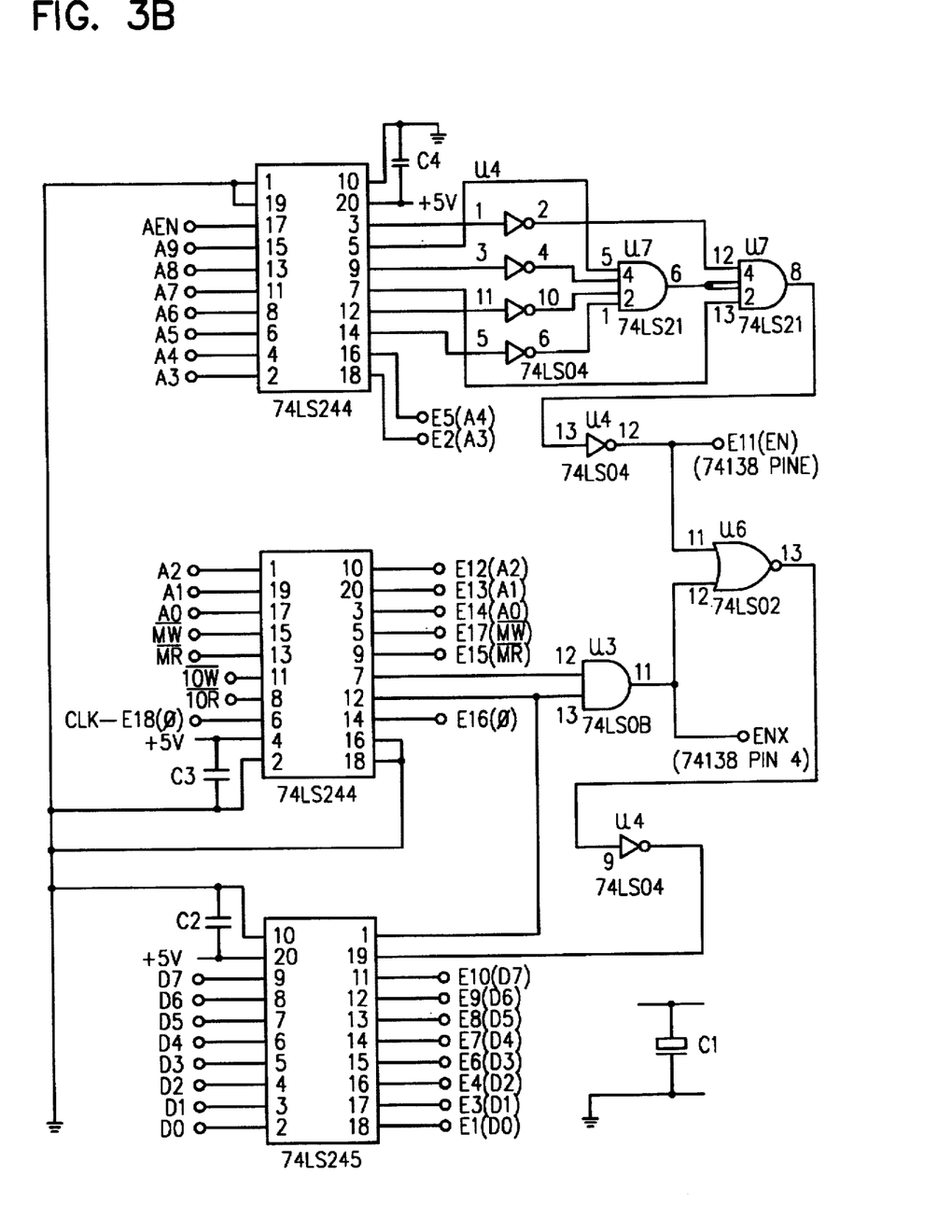

Three length encoders 10, as described above, are connected to a personal computer through an interface circuit as shown in FIGS. 3A and 3B. This interface allows a program being run by the personal computer to devise data indicative of the full length of cord 34 from the signals generated by the transducers 18.

Figure 4:
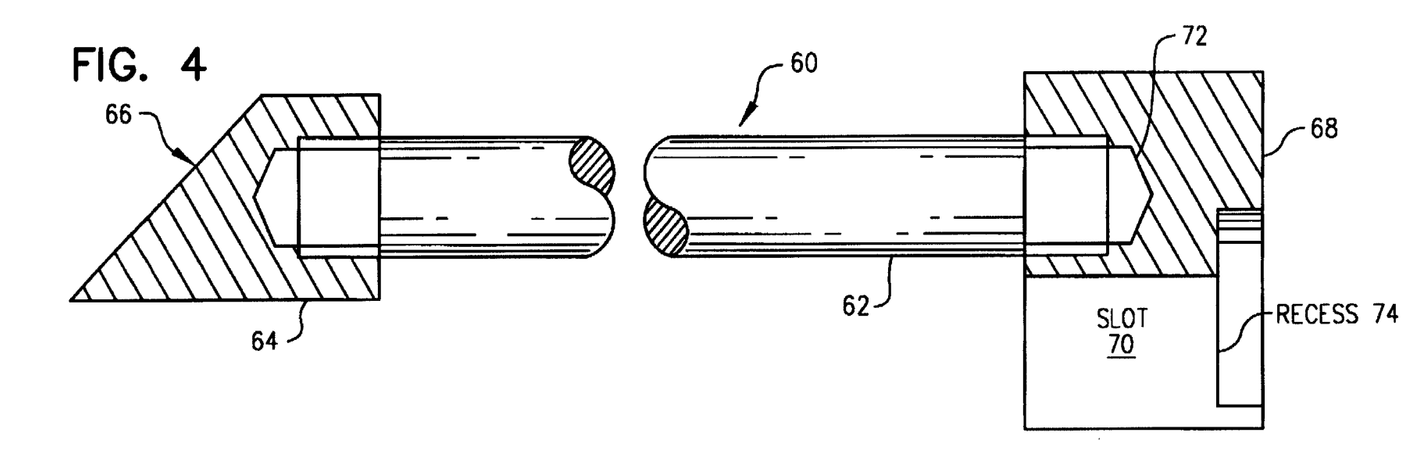
FIG. 4 is a sectional view of a calibration rod for use in the present invention.
Figure 5:
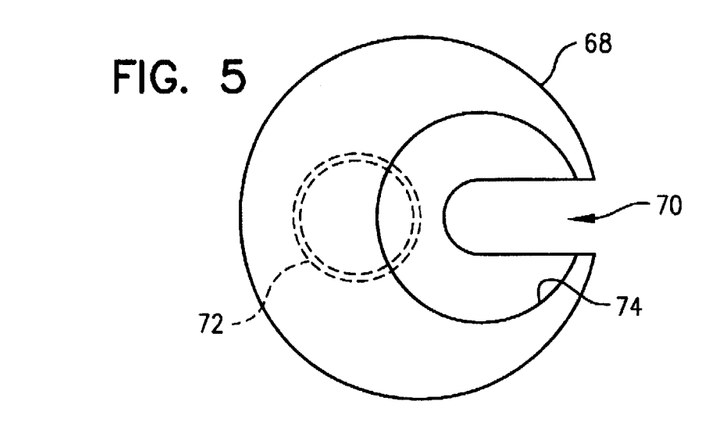
FIG. 5 is an end view of the rod of FIG. 4.

With reference now to FIGS. 4 and 4, a calibration rod 60 comprises a shaft 62, end portions of which are externally threaded.

A first end fitting formed from a metal block 64 is secured to the shaft 62. A tapped hole is formed in the block 64 into which a first of the threaded end portions of the shaft 62 is fixed. The block is shaped as a square section extending axially from the shaft 62 and has a face 66 remote from the rod formed at 45° to the axis.

A second end fitting, also formed from a block of metal 68, is similarly secured to the other end portion of the shaft 62, and is illustrated in FIG. 5. The second end fitting is shaped generally as a squat cylinder. A radial slot 70 is formed in the block 68 extending throughout its axial length. A tapped hole 72 extends axially into a first end face of the block 68, the hole 72 being displaced from the centre of the block 68 along radius parallel to that of the slot 70. A circular recess 74 is cut into a second end face of the block 68, its centre lying on the centre-line of the slot 70. The fitting are attached to the shaft 62 such that the angled face 66 of the first fitting faces generally away from the slot 70 of the second fitting.

Figures 6A, 6B:
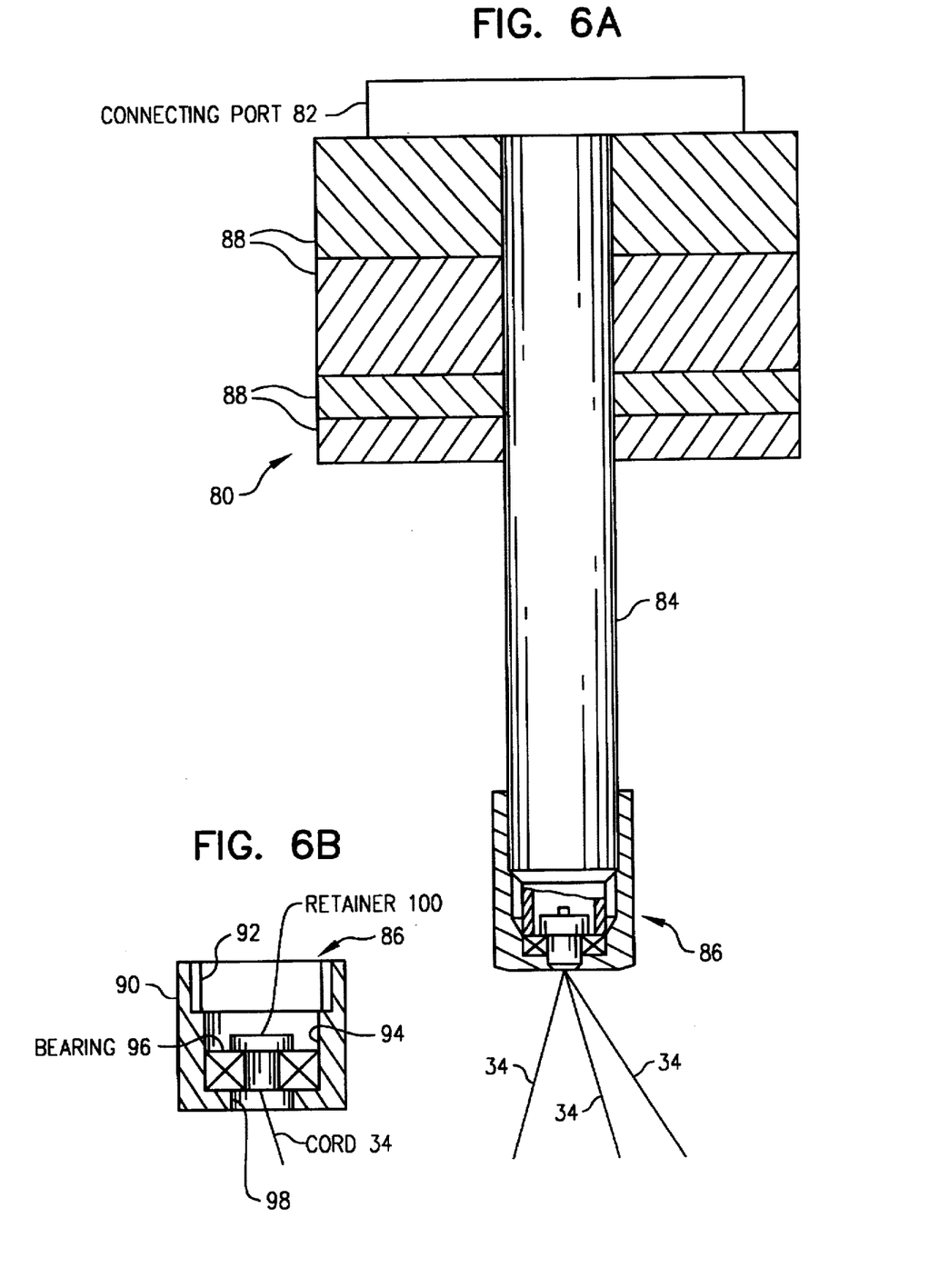
FIGS. 6A and 6B are sectional views of a line assembly for use with the present invention.

With reference now to FIGS. 6A and 6B, a line assembly 80 is provided by means of which the cords 34 from the three transducers 10 can be connected to an end effector of robot, to any other object, the position of which must be determined, or by means of which the cords 34 can be brought accurately to any point in a workspace.

The line assembly 80 comprises a connecting part 82 to connect it to a robot, the connecting part 82 being adapted to cooperate with the particular robot to which it is to be attached. A shaft 84 extends from the connecting port 82, the shaft 84 carrying a line connector assembly 86 (shown in detail in FIG. 6b) on an end portion remote from the connecting port 82. One or more weights 88 may be mounted on the shaft 84 such that the weight of the line assembly 80 is approximately equal to the weight of a tool to be used with the robot, this ensuring that any deflection caused in the robot by the weight of the tool will be present when calibration is taking place.

With reference to FIG. 6B, the line connector assembly 86 comprises a cylindrical housing 90. The housing 90 has an axial bore, a first portion 92 of which is internally threaded for threaded engagement with a threaded end portion of the draft 84. A second, intermediate portion 94 of the bore has a smooth wall and contains a rolling-element bearing 96, inserted therein through the first portion 92. A third portion of the bore 98 is of reduced diameter to provide an abutment to prevent axial movement of the bearing 96.

The cords 34 of each of the transducers 10 pass into the housing 90 through the third portion 98 of the bore. Each cord is secured to a retainer 100 which rests upon the bearing 96. By this arrangement, the cords are securely retain in the connector assembly 86, yet the connector assembly can freely rotate as the robot moves without resulting in the cords 34 becoming tangled.

In order to perform calibration of the system and of a robot, the following procedure is carried out.

1. The three encoders 10 are placed within a work station at arbitrary locations. Preferably, these are arranged in approximately an equilateral triangular disposition (as this can minimise errors) although other dispositions may be used if this arrangement would prove inconvenient. Appropriate electrical connections are made to connect the encoders 10 to the interface.

2. The calibration program is started.

3. The cord 34 of each encoder 10 is allowed to retract fully. This condition is then indicated to the program by a key press, whereupon the program records that each cord 34 is at zero extension.

4. The cord 34 of each encoder 10 in turn is then extended to the end of the calibration rod 50, and a key is pressed to indicate to the computer that this has been done. The program can then calculate the number of revolutions of the transducer per unit length of extension of the cord 34.

5. The cord 34 of each transducer 10 is then extended to the neighbouring transducer 10 to form a continuous ring. A button is pressed to record the distances.

The system can, henceforth, calculate the absolute length by which each cord 34 is extended from its transducer. Next, the system must be connected to the robot.

6. Next, the robot is directed to move to a multiplicity of points and, for each point, the data processing means records the measured coordinate (xyz)m and the intended coordinate (xyz)w of the point to which the robot moves. This information is then processed as will be described.

In order to understand the processing that is to be carried out, it is first necessary to understand the mathematics underlying the measurement system.

First, it is desired to find the coordinate of the point at which the three cords 34 meet (e.g. at a robot end effector). If it is known that the three transducers 10 lie, respectively, at points A=(0,0,0), B=(Bx, By, 0), C=(Cx, Cy, 0) within a cartesian coordinate frame with known position and orientation within the workspace (the arbitrary coordinate frame), and assuming that the cords 34 meet at an unknown point P=(Px, Py, Pz), then:

The length of cord 34 from each transducer to point P is:

A to P: Ra

B to P: Rb

C to P: Rc

Ra, Rb, Rc can be considered to be radii of spheres with centres at A, B and C respectively. All cords are connected to point P so P is a point common to the surface of each sphere. The spheres are determined by the following expressions:

$$Ra^2 = Px^2 + Py^2 + Pz^2 \quad \text{(i)}$$

$$Rb^2 = (Px-Bx)^2 + (Py-By)^2 + Pz^2 \quad \text{(ii)}$$

$$Rc^2 = (Px-Cx)^2 + (Py-Cy)^2 + Pz^2 \quad \text{(iii)}$$

The above expressions have unknowns Px, Py, Pz, which together specify the coordinates p of the end effector. The solution for P can be obtained as follows:

From (i) substitute $Pz^2 = Ra^2 - Px^2 - Py^2$ into (ii) to obtain $$Rb^2 = (Px-Bx)^2 + (Py-Cy)^2 + Ra^2 - Px^2 - Py^2 \quad \text{(iv)}$$
$$= Bx^2 + By^2 + Ra^2 - 2PxBx - 2PyBy$$

and into (iii) to obtain $$Rc^2 = (Px-Cx)^2 + (Py-Cy)^2 + Ra^2 - Px^2 - Py^2 \quad \text{(v)}$$
$$= Cx^2 + Cy^2 + Ra^2 - 2PxCx - 2PyCy$$

from (iv) substitute
$Px = (Bx^2 + By^2 + Ra^2 - 2PyBy - Rb^2)/(2Bx)$
in (v) giving $$Rc^2 = Cx^2 + Cy^2 + Ra^2 - Cx/Bx(Bx^2 + By^2 + Ra^2 - 2PyBy - Rb^2) - 2PyBy \quad \text{(vi)}$$

Let $$I = Cx^2 + Cy^2 + Ra^2 - Rc^2 - Cx/Bx(Bx^2 + By^2 + Ra^2 - Rb^2) \quad \text{(vii)}$$

Substitute (vii) into (vi) to give
2PyCy−2Px PyBy/Bx=I
Py (2BxCy−2CxBy)/Bx=I $$P_y = Bxl/(2BxCy-2CxBy) \quad \text{(viii)}$$

substituting (viii) into (iv) to give $$P_x = Bx^2 + By^2 + Ra^2 - Rb^2 - ByBxl/(BxCy-CxBy) \quad \text{(ix)}$$

and substitute (viii) and (ix) into (i)

$$P_z = \sqrt{(Ra^2 - Px^2 - Py^2)} \quad \text{(x)}$$

So Px, Py, Pz can be obtained.

This can be simplified if it is assumed that transducer B lies on the x-axis, such that By=0. Then (vii) becomes:

$$l = Cx^2 + Cy^2 + Ra^2 - Rc^2 - Cx/Bx(Bx^2 + Ra^2 - Rb^2)$$

so from (viii), (ix) and (x)
Py=l/(2Cy)
Px=(Bx²+Ra²−Rb²)/(2Bx)

$$P_z = \sqrt{(Ra^2 - Px^2 - Py^2)}$$

Bx is simply the distance along the x-axis from A to B and was measured at Step 5, above. All that must now be determined are the values Cx, Cy.

Let A to C=J and C to B=K and
Θ=angle at BAC (transducer A) then
K²=Bx²+J²−2BxJCosθ but
Cosθ=Cx/J so
K²=Bx²+J²−2BxCx
Cx=(Bx²+J²−K²)/(2Bx)
Choose Cy to be positive $$Cy = \sqrt{(J^2 - Cx^2)}$$

It will be remembered that the distances J and K were measured in step 5 above, so it is now possible to map the linear measurements obtained from the transducers 10 into an arbitrary cartesian coordinate frame m within the workpiece, albeit one of which the original and orientation is, as yet, unknown.

The next stage is to estimate the origin and orientation of the arbitrary coordinate system m with respect to the workspace coordinate system w. This is done by approximation by a multivariable search system, as follows:

assume that the position of the coordinates in the arbitrary coordinate frame of the end effector are xm, ym, zm, and xw, yw, zw are its coordinates within the workspace coordinate frame. The origin of the arbitrary frame within the workspace frame is denoted $x_ow$, $y_ow$, $z_ow$.

The first search varies $x_ow$, $y_ow$ and $z_ow$ for the sum of abs(d1−d2) over all points data recorded at step 6, above, where d1 and $d_2$ both represent the distance from the end of the robot tool to the arbitrary coordinate frame origin, calculation as follows:

$$d1 = \sqrt{(xm^2 + ym^2 + zm^2)}$$

$$d2 = \sqrt{((x_ow - xw)^2 + (y_ow - yw)^2 + (z_ow - zw)^2)}$$

It will be seen that this search establishes the origin of the arbitrary coordinate frame independently of its orientation.

Next, an estimation of the orientation of the system is made. The three variables varied in the search are $a_m$, $b_m$, $c_m$, respectively representing the roll, pitch and yaw of the arbitrary frame with respect to the workspace frame. In this case, the search attempts to minimise the sum over all measured coordinates of the variable d where d=distance between points p1 and p2
p1=Tm * transpose (xm, ym, zm)
p2=$X_w$, $Y_w$, $Z_w$
and where Tm is the transformation matrix representing the position and orientation of the arbitrary coordinate frame relative to the workspace coordinate frame, and is calculated from $x_om$, $y_om$, $z_om$, $a_m$, $b_m$ and $c_m$.

Then, the errors between the theoretical and actual kinematic models of the robot can be calculated in a third search. Additionally, the origin position and orientation estimates can be improved upon.

The search variables are:
the joint offsets defining the zero positions of the robot (thi for a rotational joint and di for a translational joint),
the errors in the distances (link lengths) and offsets between the joint axes of the robot (ai and di, respectively) $x_om$, $y_om$, $z_om$, $a_m$, $b_m$, $c_m$ (note that the preceding searches have provided first estimates for these six variables).

The function to be minimised is the same as that of the second search, above, except that the values $x_w$, $y_w$, $z_w$ are calculated for the joint values for each point by forward kinematics using the modified robot parameters (thi, di, ai, di).

The values obtained by the above searches are applied to a filter to modify control signals sent to the robot to account for the discrepancies between the actual and theoretical kinematic models.

Once the above searches have been accomplished, the data can be used to carry out off-line programming using a robot simulation system.

Robot simulation packages are used to generate teachpoints using a model of the robot workcell and a CAD representation of the parts to be operated on in a workcell. These teachpoints are generated using the calibrated robot model (which includes the modifications in the parameters and the tool offset calculated by the calibration searches). When they are written to a file they first pass through a filter which prepares them to fool the real robot to go to the desired position.

First, the joint values for the robot are calculated using the calibrated inverse kinematics for the robot. If the real robot will accept teachpoints in this form then no modification to the teachpoint is required before downloading to the real robot. However, if the real robot will only use teachpoints that are expressed in Cartesian (e.g. x, y, z, roll, pitch, yaw) form then these must be calculated from the joint values using the uncalibrated forward kinematics.

Similarly, when loading a teachpoint from a real robot back into the robot model in the simulation, it is necessary to use an opposite filter.

Once the robot has been calibrated and its offline programmed accuracy improved to a suitable level, then the robot may itself be used as a measuring device to find the true position of the fixtures in the workcell relative to the robot. This is an important issue since without knowing these positions accurately, the offline generated robot programs would be unusable. Another method of measuring the position of fixtures is by disconnecting the cords from the robot and moving them to several points on the fixture (any measurements taken after the calibration is adjusted by the system so that they are expressed relative to the robot base). (A prior art method would be to use theodolites to measure the position of the robot base and all important points on the fixture. However, this method involves a great deal of time and expense).

Once the position of the fixtures relative to the robot is known, then the position of the models of the fixtures in the simulation package can be adjusted, enabling the simulation to generate accurate robot paths relative to the fixtures and the parts held in the fixtures.

It is also the case that the transducers may be mounted on a fixture during calibration of the robot instead of being mounted on the floor, then the calibration of the robot and tool also calibrates the fixture finding its position and orientation relative to the robot. In the above description of the software algorithm for extracting the robot errors, the variables $x_om$, $y_om$, $z_om$, $a_m$, $b_m$, $c_m$ would come in such an arrangement to represent the position and orientation of the fixture. The advantage of this is clear: it removes the need for any additional activity to calibrate the fixture. It is also the case that to make it easier to set this method of calibration up, the system may be redesigned with the drums all together at the end of the tool and location pins on the end of the three cables which would be extended to three positions on the fixture as far apart from each other as possible.

What is claimed is:

1. A system for approximating an actual kinematic model of a robot comprising coordinate generating means operative to generate coordinates (xyz)m of an effector of the robot within an arbitrary coordinate frame m; and data processing means operative to send movement instructions to the robot and receive coordinate data from the generating means; wherein the data processing means:

for a multiplicity of points within the workspace in turn, instructs the robot to move to the coordinate (xyz)w of that point in a known workspace coordinate frame w, and records the arbitrary coordinates (xyz)m of the point to which the robot moves; then using the recorded data, establishes the relationship between the arbitrary coordinate frame m and the workspace coordinate frame w; for each of the multiplicity of points, converts the recorded coordinate to a coordinate (xyz)'w within the workspace coordinate and compares each of the coordinates (xyz)'w to which the robot moved with the corresponding coordinate (xyz)w to which it was directed in order to estimate the modifications required to the theoretical kinematic model to approximate an actual kinematic model for the robot, and wherein the coordinate generating means comprises three measuring means, each operative to indicate the distance between itself and the robot effector and wherein these measuring means each comprise a cord wound on a drum having tensioning means to maintain tension in the cord, signals being generated on rotation of the drum.

2. A system according to claim 1 in which the coordinate generating means comprises signal processing means operative:

to receive signals from the measuring means;

to process these signals; and to generate coordinate data in the arbitrary coordinate frame.

3. A system according to claim 2 in which the signal processing means is constituted in the data processing means as a software program for execution thereby.

4. A system according to claim 3 in which the measuring means are preferably disposed in an eqilateral triangle or in an approximate equilateral triangle.

5. In a system for approximating an actual kinematic model of a robot comprising coordinate generating means operative to generate coordinates (xyz)m of an effector of the robot within an arbitrary coordinate frame m; and data processing means operative to send movement instructions to the robot and receive coordinate data from the generating means; wherein the data processing means:

for a multiplicity of points within the workspace in turn, instructs the robot to move to the coordinate (xyz)w of that point in a known workspace coordinate frame w, and records the arbitrary coordinates (xyz)m of the point to which the robot moves; then using the recorded data, establishes the relationship between the arbitrary coordinate frame m land the workspace coordinate frame w; for each of the multiplicity of points, converts the recorded coordinate to a coordinate (xyz)'w within the workspace coordinate and compares each of the coordinates (xyz)'w to which the robot moved with the corresponding coordinate (xyz)w to which it was directed in order to estimate the modifications required to the theoretical kinematic model to approximate an actual kinematic model for the robot:

a method of establishing the relationship between an arbitrary coordinate frame m and a workspace frame comprising a multivariable search method, said search method including a first step in which the position of an origin of the arbitrary coordinate frame m within the workspace coordinate frame w is estimated, and a second step in which the orientation of the arbitrary coordinate frame is estimated.

6. A method of generating an improved off-line program for a robot from an existing approximate off-line program for a robot comprising:

(a) issuing to the robot a set of commands which, by a first approximate kinematic model would send an effector to each of Po . . . Pn in turn, each Po . . . Pn being at coordinate $xyz''o \ldots xyz''n$ with a workspace coordinate frame;

(b) measuring for each point Po . . . Pn the distance of the effector from these points A, B, C to yield a data triplet $ABC_o \ldots ABC_n$, each data triplet being recorded; and processing the data as follows:

(c) for each triplet $ABC_o \ldots ABC_n$, generating a coordinate $xyz'''o \ldots xyz'''n$ within an arbitrary coordinate frame m;

(d) estimating a point $x_o y_o z_o''$ within the workspace coordinate frame as per the origin of the arbitrary coordinate frame m;

(e) estimating variables $a_m$, $b_m$, and $c_m$ representative of the roll, pitch and yaw of the arbitrary coordinate frame m within the workspace coordinate frame;

(f) estimating link lengths and joint zero positions for all links and joints in the robot; and (g) modifying said existing approximate off-line program to compensate for the differences between the estimated link lengths and joint zero values and those used to generate the kinematic model.

7. A method according to claim 6 in which the arbitrary coordinate frame may is a cartesian frame.

8. A method according to claim 6 in which the arbitrary coordinate frame may is a polar frame.

9. A method according to claim 6 in which step (c) generates $xyz'''$ by the formula:

$X_i = (B_x^2 + A_i - B_i)/2B_x$ $Y_i = 1/2Cy$ $Z_i = \sqrt{A_i^2 - x_i^2 - Y_i^2}$ where:

$I = C_x^2 + C_y^2 + A_i - C_i - C_x/B_x/B_x^2 + A_i^2 - B_c^2)$ $B_x$ = the distance between measuring points A and B $C_x = B + J^2 - K^2$ $C_y = +\sqrt{J^2 - C_x^2}$ J = the distance between measuring points A and C; and K = the distance between measuring points C and B.

10. A method according to claim 9 in which step (c) is accomplished by using a multivariable search to minimise:

$$\sum_{i=d}^{n} d_i$$

in which d = distance between points p1 and p2

$$p1 = T * \begin{pmatrix} X_i \\ Y_i \\ Z_i \end{pmatrix}$$

$$p2 = XYZ^m i$$

where T is the Transferation matrix.

11. A method according to claim 6 in which step (d) is performed using a multivariable search, in which, the value:

$$\sum_{i=0}^{n} abs\,(d1_i - d2_i)$$

is minimised where:

$d1_i = \sqrt{X^2 + Y^2 + Z^2}$ $d2_i = \sqrt{(X_o - X) + (Y_o - Y) + (Z_o - Z)}$.

12. A method according to claim 6 in which step (e) comprises a multivariable search where the variables are robot link lengths at joint zero angles, where the object of the search is to minimise the sum $$\sum_{i=d}^{n} abs\,(d1_i - d2_i)$$

where:

$d1_i = \sqrt{X^2 + Y^2 + Z^2}$ $d2_i = \sqrt{(C_o - X)^2 + (Y_o - Y)^2 + (X_o - Z)^2}$ where the values of X,Y and Z are modified by forward kinematic calculation using the modified kinematic calculated in steps (a) to (d).

* * * * *